July 23, 1935.  C. SAUZEDDE  2,008,728
WHEEL HUB HYDRAULIC BRAKE
Filed March 31, 1930
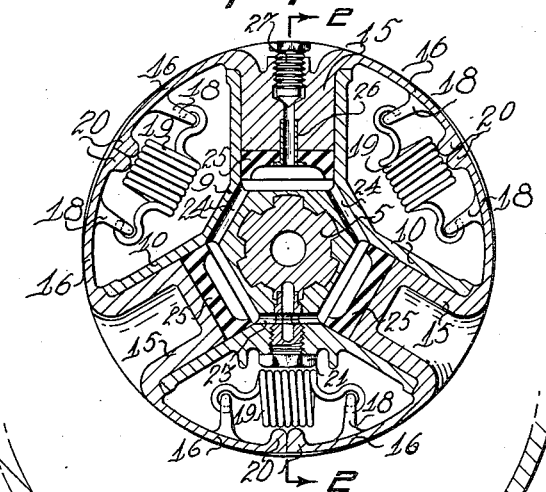
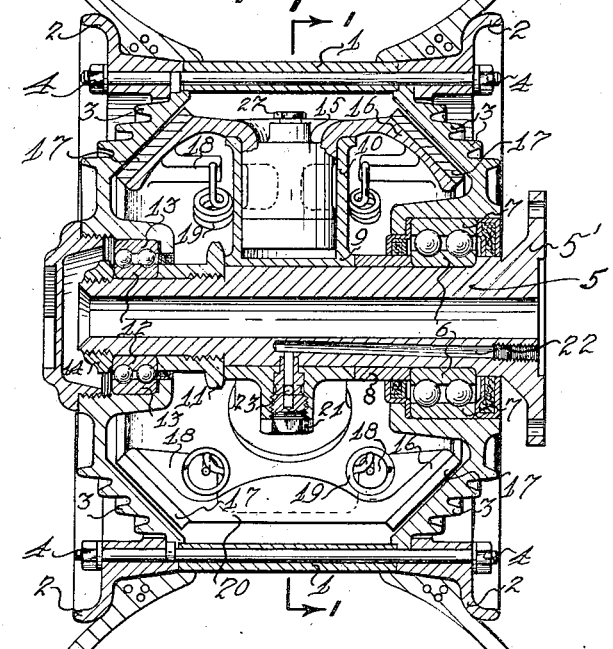
INVENTOR
Claude Sauzedde
BY
ATTORNEYS Patented July 23, 1935

2,008,728

UNITED STATES PATENT OFFICE 2,008,728

WHEEL HUB HYDRAULIC BRAKE

Claude Sauzedde, St. Clair, Mich., assignor to Detroit Hydrostatic Brake Corporation, a corporation of Michigan Application March 31, 1930, Serial No. 440,276

15 Claims. (Cl. 188—152)

The present invention relates to motor-vehicle and aircraft wheels having combined hub and wheel-body side members attached to a combined spacing and tire-supporting member to form a chamber within which braking mechanism is housed, all the elements comprising the disclosed combination serving to constitute a unitary structure adapted for ready attachment to and detachment from the axles of all types of aircraft and self-propelled vehicles.

Some of the objects sought in developing the structure herein disclosed are more effective protection of braking mechanism than has heretofore been provided, greater area of braking surface than characterizes other brake applications, greater uniformity of frictional resistance, more even distribution of braking stresses, more thorough dissipation of heat, more nearly perfect compensation for the effects of wear, greater length of useful life through greatly reduced wear due to absolute exclusion of water, dust, grit, and lubricant from the hub chamber within which the braking mechanism is mounted. Other objects sought and accomplished will appear upon following the accompanying description and tracing features of construction as revealed by the drawing, of which Figure 1 is a median-line sectional view taken on line 1—1 of Fig. 2, which is a vertical sectional view taken on the line 2—2 of Fig. 1, the same reference figures being applied to like parts in both views, as follows:

1—Central member or wheel rim lying between two oppositely-disposed axially-aligned air-cooled brake drums and a pair of outwardly flanged rings for holding tire in place.

2—Oppositely-disposed detachable flanged rings for securing tire casing to wheel rim.

3—Piloted air-cooled combined hub and wheel-body brake-drum members symmetrically disposed with reference to median plane of wheel.

4—Non-turning through bolts for holding parts 1, 2, and 3 together as a unitary wheel-hub and wheel-body structure.

5—Detachable stub-axle spindle or wheel-supporting member to which brake actuating mechanism is fixedly attached and on which are mounted the inner races 6 and 12 of anti-friction wheel bearings.

5'—Stub-axle spindle flange to which complementary axle-end, axle-housing, or steering-knuckle flanges may be bolted.

6—7—Inner and outer races of inner anti-friction wheel bearing.

8—Collar serving as distance piece and abutment for holding in place the inner race of inner wheel bearing.

9—Internally serrated hub of fixedly-positioned spider having a plurality of integrally formed radially extending expansion chambers or cylinders 10.

11—Combined distance piece and nut by which hub 9, collar 8 and race 6 are rigidly held in place on wheel-supporting detachable axle end.

12—13—Inner and outer races of outer anti-friction wheel bearing retained in recesses of inner and outer hub-drum members 3.

14—Nut by which inner race of outer bearing of wheel is held against abutting outer face of shank of nut 11.

15—Circular inwardly-extending radially-disposed brake shoe piston-type projection within expansion cylinder 10.

16—Conical sectional type segmental brake shoe members having parallel angularly-disposed oppositely-positioned surfaces to which brake-shoe lining 17 is riveted.

18—Integrally-formed inwardly-extending piston-type projections of brake shoe members over which the ends of retracting springs 19 are hooked.

19—Retracting springs hooked over projections 18 of adjoining brake shoe members to hold them in their normal non-contacting position.

20—Stiffening webs between the oppositely-positioned angularly-faced annular portions of brake-shoe members.

21—Screw-threaded drainage-plug closure for cylinder spider hub chamber communicating with a fluid supply passage 22 in stub-axle spindle and with other passages 23—24 in spider hub in communication with the expansion cylinders 10.

25—Resilient piston head for sealing expansion cylinder and cupped to form a chamber into which fluid under pressure is forced through passages 22—23—24 forming a complete circuit.

26—Hollow flanged sleeve-type connector serving to establish communication between the expansion chamber of uppermost cylinder and a passage leading to a chamber from which all air is driven from the brake actuating mechanism prior to sealing by valve-type plug 27.

27—Nut-type threaded member serving as a valve-type closure for chamber and passage at highest point of brake-actuating fluid supply duct system, where air is discharged and chamber thereupon sealed.

28—29 metal enclosed packing by which inner and outer bearings in hub-drum members 3 are sealed to prevent escape of lubricant from bearings to braking mechanism and of abraided particles of friction material from braking-mechanism chamber to bearings.

To the central member 1 of the wheel rim the flanges 2, as shown by Fig. 2, are held against the piloted hub flange 3 by through bolts 4 provided with lugs near the left-hand ends to keep them from turning when the nuts that hold on the outer, or left-hand, rim flange are removed and replaced on changing tires.

The elementary wheel structure comprising parts 1, 2, 3 and 4 is mounted on a stub-axle spindle or detachable axle end 5 having a piloting flange 5' that may be bolted to the correspondingly flanged end of a dead axle or flanged front-axle steering knuckle. As is customary, the wheel structure rotates on inner and outer anti-friction bearings, the inner race 6 of the inner bearing being mounted on the stub axle spindle 5, while the outer race 7 of the inner bearing is pressed into an axially-aligned or concentric recess in the inner brake-drum member.

Pressed against the inner race 6 is a distance piece or collar 8 against the outer end of which bears the hub 9 of a spider having a plurality of integrally-formed cylinders 10 radially disposed and equally spaced. The hub 9 is internally serrated to fit over corresponding serrations of the detachable axle end 5, on which it is thereby fixedly positioned, and is held against the distance piece or collar 8 by the combination distance piece and nut 11, against which the inner race 12 of the outer-anti-friction wheel bearing abuts, the outer race of the outer bearing being pressed into an axially-aligned or concentric recess in the outer brake drum member. The nut 14 rigidly holds the inner race of the outer wheel bearing against the distance piece 11.

An inwardly-extending circular projection 15 on the under side of each brake shoe section 16 is adapted to enter each of the expansion chambers 10 forming an integral part of the spider hub 9 fixedly mounted on the detachable axle end 5.

The conical two-faced brake shoe 16 is of sectional type, the number of sections corresponding to the number of radially arranged expansion cylinders 10, brake lining 17 being riveted in the usual manner to the oppositely-positioned angularly-disposed flat surfaces of each section separately. The opposite sides of each brake shoe section are oppositely inclined at equal angles, the contacting surfaces of the oppositely-positioned brake drums being similarly inclined, so that the mechanical advantage of wedging action is secured when each brake shoe section moves outwardly under radially-extended fluid pressure communicated simultaneously to each of the brake shoe sections 16.

On the under side of each brake-shoe section are oppositely-placed lugs 18 over adjacent pairs of which the ends of tension springs 19 are hooked, as shown most clearly in Fig. 2, for holding the brake shoe sections in their normally retracted or non-contacting position. Webs 20 between the oppositely-positioned braking surfaces of each brake-shoe section are provided to insure sufficient strength to withstand the wedging stress set up when radially exerted fluid pressure forces the pistons 15 outwardly, bringing the faces of the integrally associated brake-shoe sections 16 into contact with brake-drum surfaces inclined towards each other in the manner shown by Fig. 2.

At the lowest point in a system of ducts through which fluid pressure is communicated to the expansion cylinders there is a screw-threaded drainage plug 21 giving access to a fluid-supply passage 22 in the detachable axle-end member 5. From passage 22 a continuous system of ducts affords simultaneous unobstructed communication with all of the expansion cylinders, which are hermetically sealed by piston heads 25 of resilient material.

When the brake-actuating fluid is introduced, whatever air there may be in the system is forced out through a passage in the piston of the uppermost expansion cylinder of each wheel unit, a flanged hollow sleeve-type connector 26 pressed into both piston head seal 25 and piston-type body 15 affording communication between the expansion chamber of the upper cylinder and an outwardly directed passage that is closed by a threaded valve-type plug 27, cutting off the flow of fluid conducted through an opening in the wheel rim member 1, none of the fluid being permitted to escape into the hub chamber inclosing the brake shoes and actuating mechanism when the air is being forced out.

Provision for rapid dissipation of heat and consequent protection of the brake lining is made by integral ribbing of the brake drums 3 from which concentrically arranged air-cooling fins project outwardly, as shown in Fig. 2, without detracting from the external appearance of the wheel. The members 3 serve a double purpose in that they are inner and outer elements or side members of the wheel hub and wheel body as well as brake drums providing dual or double contacting surface of greater area than is characteristic of the present-day designs wherein the contacting surfaces are not similarly inclined to obtain the mechanical advantage of wedging action upon application of the brake-setting force.

Not only are the brake drum hubs recessed to receive anti-friction bearings, from which there can be no escape of lubricant to the braking surfaces because of intervening metal-inclosed packing 27—28, but accurate peripheral piloting thereof for reception of the central and flanged members of the wheel rim insures axial alignment of all the principal elements of the wheel structure, which is rigidly tied together by the through bolts 4, the braking mechanism rigidly mounted mounted on member 5 occupying the dust-proof waterproof hub and wheel-body chamber formed when the parts are bolted together.

In assembling the various parts the inner metal-inclosed lubricant retainer is placed in the bearing recess of the inner brake drum hub, followed by the inner bearing and outer retainer that bears against it. The members of this sub-assembly are then pressed on member 5 and after inner race 6 is brought against its stop shoulder thereon the distance piece 8 is placed in position, followed by the expansion-cylinder spider member, to which the brake shoes and their retracting springs have been applied, the internal serrations of the spider hub 9 fitting the corresponding external serrations of the axle-end member 5, so as to hold it rigidly in non-moving relation to it and to the rotating brake drums.

The hub of the cylinder spider 9 is held tightly against the distance piece 8 by the combined nut and distance piece 11, against the outer end of which the inner race of the outer bearing abuts.

After making whatever adjustments are necessary to insure centralization of brake shoe sections with braking surfaces of the hub drums when the structure is completely assembled, the central member 1, inner flange ring 2 and bolts 4 are put in place and drawn up tight. The inner lubricant retainer of the outer bearing is then placed in the outer drum hub recess, followed by the outer bearing, the inner race of which is held tightly against the shank of the distance nut 11 by the nut 14; a screw-threaded cap closing the outer bearing recess. While the flanged outer tire rim ring 2 helps to stiffen the completed structure the bolts 4 serve to hold the parts together.

This descriptive explanation clearly covers a structural combination of unusual simplicity, furnishing extraordinary protection against deterioration of brake lining, and consequent loss of braking efficiency, insuring more effective operation through greatly increased area of braking surface, and providing automatic compensation for the effects of wear, thereby eliminating necessity for making adjustments for that purpose.

What I claim is:—

1. In hydrostatic brake systems, wherein brake application is by fluid pressure applied through a pressure line leading to the point of application, the combination with a wheel-supporting axle carrying a terminal zone of such pressure line, of a wheel supported by the axle, said wheel having a hub portion the diameter of which is approximately equal to one-third of the overall diameter of the wheel, and brake mechanism housed within said hub portion, said hub-portion having opposing spaced-apart braking surfaces, an annular member between and spacing said walls to constitute the interior of the hub portion as a chamber symmetrical to a plane extending through the wheel tread and normal to the axle, said brake mechanism including brake shoe formations within said chamber, and cylinder and piston formations arranged relative to and in operative communication with such terminal zone to cause piston movements to advance the shoes into contact with the braking surfaces in presence of pressure applied through the pressure line.

2. A system as in claim 1 characterized in that the piston and brake shoe movements are in radial directions of the wheel.

3. A system as in claim 1 characterized in that the piston and cylinder formations are located on planes intermediate the opposing brake shoe surfaces which are rendered active by a piston formation.

4. A combined wheel and brake formation adapted for service with an axle carrying a terminal zone of a fluid pressure line of a hydraulic braking system, said wheel including a hub section and a tire section, said hub section having opposing side walls, an annular spacing member for the peripheral zones of the side walls to complete a chamber substantially symmetrical to a plane normal to the axle and extending through the wheel tread, said side walls carrying internal annular braking surfaces, a spider within said chamber and adapted to be secured to said axle, and brake mechanism within said chamber, said mechanism including piston and cylinder formations carried by the spider, said cylinders having operative communication with said terminal zone when the wheel is in position on the axle, and brake shoe formations individual to and applied by piston movements, each brake-shoe formation including a pair of surfaces adapted to co-operate concurrently with the opposed braking surfaces when advanced by their piston.

5. A wheel and brake formation as in claim 4 characterized in that the piston and brake shoe movements are in radial directions of the wheel.

6. A wheel and brake formation as in claim 4 characterized in that the piston and cylinder formations extend substantially symmetrical to such plane through the tread and lie between planes of the opposing brake shoe surfaces.

7. A combined wheel and brake formation adapted for service with an axle carrying a terminal zone of a fluid pressure line of a hydrostatic braking system, said wheel including a hub section and a tire section, said hub section having opposing side walls, an annular spacing member for the peripheral zones of the side walls to complete with said walls a chamber substantially symmetrical to a plane normal to the axle and extending through the wheel tread, said side walls carrying internal annular braking surfaces, a spider within said chamber and adapted to be secured to said axle, and brake mechanism within said chamber, said mechanism including a plurality of cylinders carried by the spider with the cylinder axes extending radial of the wheel, a piston for each cylinder, and a brake shoe formation for each cylinder and piston unit, each brake shoe formation including a pair of opposing brake surfaces adapted to be concurrently engaged with the side wall braking surfaces when the formation is advanced by its piston, each cylinder having operative communication with the pressure line terminal zone of the axle.

8. A combined wheel and brake formation as in claim 7 characterized in that the respective brake-shoe formations are interconnected by springs operative to move the formations out of operative engagement with the braking surfaces.

9. A combined wheel and brake formation as in claim 7 characterized in that the axes of the respective cylinders lie in the wheel tread plane referred to.

10. A combined wheel and brake formation as in claim 7 characterized in that the axes of the respective cylinders lie in such wheel tread plane with the brake shoe surfaces lying outside of and beyond the cylinder walls, the brake shoe formation being operatively connected with the piston of the cylinder formation, with the formation movable radially with the piston, adjacent brake shoe formations being interconnected by springs.

11. A combined wheel and brake formation as in claim 1 characterized by a pair of annular members positioned to co-operate with the annular spacing member to form the tire seat of the wheel.

12. A combined wheel and brake formation as in claim 4 characterized by a pair of annular members positioned relative to the annular spacing member and co-operating therewith to form the tire seat of the wheel.

13. A combined wheel and brake formation as in claim 4 characterized by a pair of annular members co-operative with the annular spacing member to position the side walls of the hub section, and co-operative with the spacing member in forming the tire seat of the wheel.

14. A combined wheel and brake formation as in claim 7 characterized in that a radial section of a side wall presents its braking surface as inclined relative to such wheel tread plane with the inclined surface leading to such annular spacing member, the inclined surface lying within the outer half of the radial distance of the side wall.

15. A combined wheel and brake formation as in claim 4 characterized in that the braking surfaces of a side wall lie within the outer half of the radial length of the wall, the outer surface of the wall within the braking surface zone having provisions for heat-dissipation.

CLAUDE SAUZEDDE